(12) United States Patent
Brennan et al.

(10) Patent No.: US 12,266,139 B2
(45) Date of Patent: Apr. 1, 2025

(54) METHOD AND SYSTEM FOR INTEGRATING COMPRESSION

(71) Applicant: Advanced Micro Devices, Inc., Santa Clara, CA (US)

(72) Inventors: Christopher J. Brennan, Boxborough, MA (US); Pazhani Pillai, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 666 days.

(21) Appl. No.: 17/551,097

(22) Filed: Dec. 14, 2021

(65) Prior Publication Data

US 2023/0186523 A1 Jun. 15, 2023

(51) Int. Cl.
*G06T 9/00* (2006.01)
*G06T 15/00* (2011.01)

(52) U.S. Cl.
CPC ............ *G06T 9/001* (2013.01); *G06T 15/005* (2013.01)

(58) Field of Classification Search
CPC .......... G06T 9/001; G06T 15/005; G06T 9/00
See application file for complete search history.

(56) References Cited

U.S. PATENT DOCUMENTS

| | | | | |
|---|---|---|---|---|
| 6,289,118 | B1* | 9/2001 | Cossey | G06T 9/00 382/162 |
| 11,170,533 | B1* | 11/2021 | Hillman | G06T 9/00 |
| 2013/0155075 | A1* | 6/2013 | Matsui | H04N 19/137 345/501 |
| 2016/0086374 | A1* | 3/2016 | Farrell | G06T 9/00 345/422 |
| 2021/0056731 | A1* | 2/2021 | Yang | G06T 9/00 |
| 2022/0051445 | A1* | 2/2022 | Hillman | G06T 15/10 |
| 2022/0375132 | A1* | 11/2022 | Abello Rosello | G06T 9/005 |

* cited by examiner

*Primary Examiner* — Christopher M Brandt
(74) *Attorney, Agent, or Firm* — Volpe Koenig (57) ABSTRACT

A method and apparatus for integrating data compression in a computer system includes receiving first data at a first system level. Based upon a number of planes of the first data being less than or equal to a threshold, the data is compressed with a first data compression scheme, and transferred to a second system level for processing. Based upon the number of planes of the first data exceeding the threshold, the first data is transferred uncompressed to the second system level for processing. Based upon the received data at the second system level being compressed with the first compression scheme, the data is transferred to a third system level, and based upon the received data at the second system level being uncompressed with the first compression scheme, compressing the data with a second compression scheme, and transferring the compressed data to the third system level.

20 Claims, 5 Drawing Sheets

METHOD AND SYSTEM FOR INTEGRATING COMPRESSION

BACKGROUND

In systems utilizing compression schemes, data such as color and/or depth information is sometimes compressed utilizing different compression schemes. One method of compression utilized is delta color compression (DCC) while another compression scheme utilized data compression is planar compression.

Depth buffers, which are utilized in a graphics processing unit (GPU) typically transfer planar compressed data or uncompressed data to higher layer caches, which may utilize significant bandwidth depending on the amount of data to be transferred.

BRIEF DESCRIPTION OF THE DRAWINGS

A more detailed understanding can be had from the following description, given by way of example in conjunction with the accompanying drawings wherein.

DETAILED DESCRIPTION

Although the method and apparatus will be expanded upon in further detail below, briefly a method for integrating compression is described herein. Throughout the application below, the term "processing unit" and "processor" are typically used interchangeably.

A method for integrating data compression in a computer system includes receiving first data at a first system level. Based upon a number of planes of the first data being less than or equal to a threshold, the data is compressed with a first data compression scheme, and transferred to a second system level for processing. Based upon the number of planes of the first data exceeding the threshold, the first data is transferred uncompressed to the second system level for processing. Based upon the received data at the second system level being compressed with the first compression scheme, the data is transferred to a third system level, and based upon the received data at the second system level being uncompressed with the first compression scheme, compressing the data with a second compression scheme, and transferring the compressed data to the third system level.

An apparatus for integrating data compression in a computer system includes a first system level device, a second system level device operatively coupled with and in communication with the first system level device, and a third system level device operatively coupled with and in communication with the second system level device. The first system level device receives first data. Based upon a number of planes of the first data being less than or equal to a threshold, the first system level device compresses the first data with a first data compression scheme, and transfers the data compressed with the first data compression scheme to the second system level device for processing. Based upon the number of planes of the first data exceeding the threshold, the first system level device transfers the first data uncompressed to the second system level device for processing. Based upon the received data at the second system level device being compressed with the first compression scheme, the second system level device transfers the data to the third system level device. Based upon the received data at the second system level device being uncompressed with the first compression scheme, the second system level device compresses the data with a second compression scheme, and transfers the data compressed with the second compression scheme to the third system level device.

A non-transitory computer-readable medium for integrating data compression in a computer system, the non-transitory computer-readable medium having instructions recorded thereon, that when executed by the processor, cause the processor to perform operations. The operations include receiving first data at a first system level. Based upon a number of planes of the first data being less than or equal to a threshold, the data is compressed with a first data compression scheme, and transferred to a second system level for processing. Based upon the number of planes of the first data exceeding the threshold, the first data is transferred uncompressed to the second system level for processing. Based upon the received data at the second system level being compressed with the first compression scheme, the data is transferred to a third system level, and based upon the received data at the second system level being uncompressed with the first compression scheme, compressing the data with a second compression scheme, and transferring the compressed data to the third system level.

Figure 1:
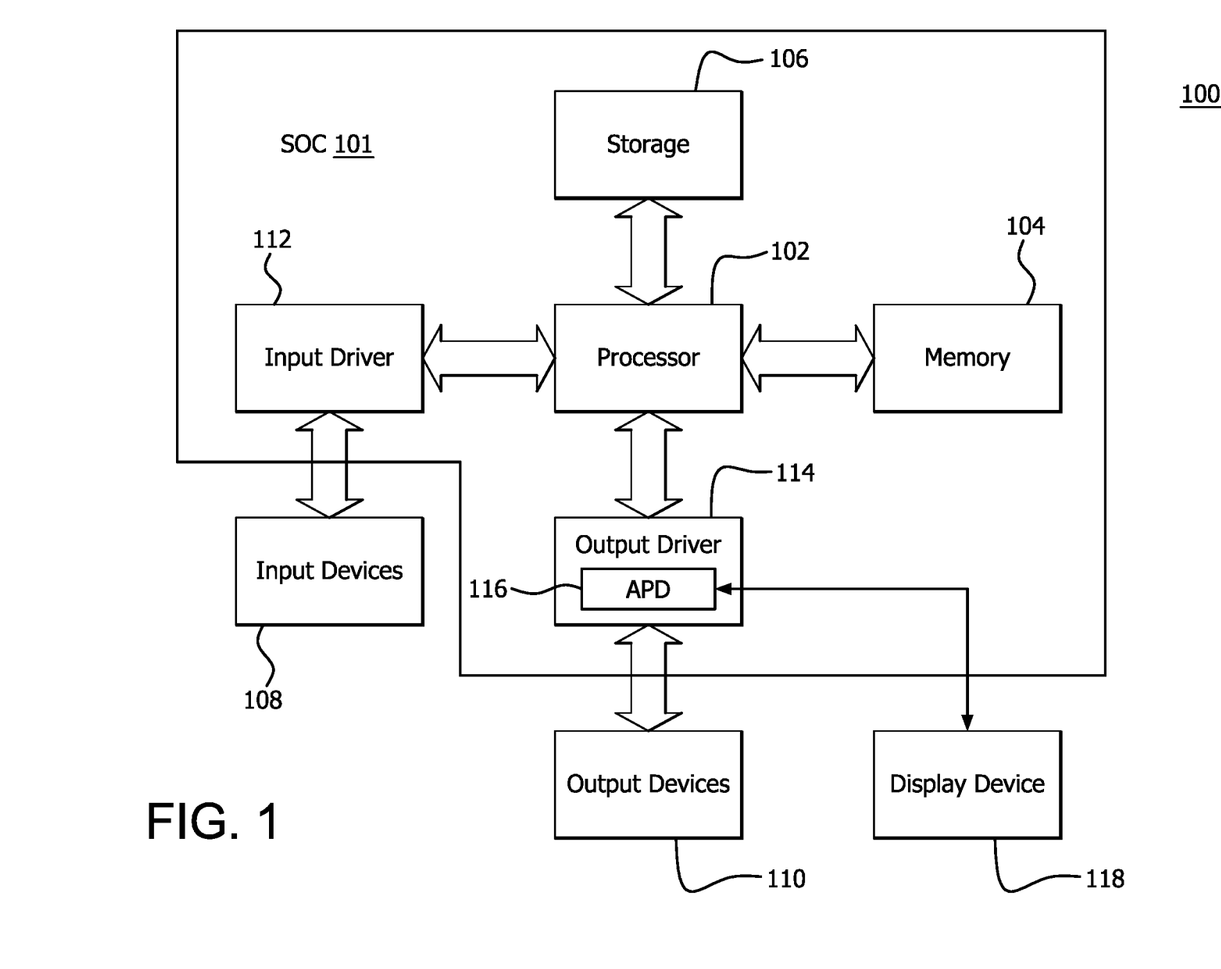
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, a server, a tablet computer or other types of computing devices for generating graphics images. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102 or is located separately from the processor 102. The memory 104 includes a volatile or non-volatile memory, for example, random access memory (RAM), dynamic RAM, or a cache. In the embodiment illustrated in FIG. 1, processor 102 includes a CPU.

The storage 106 includes a fixed or removable storage, for example, a hard disk drive, a solid-state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108 and permits the processor 102 to receive input from the input devices 108. The output driver 114 communicates with the processor 102 and the output devices 110 and permits the processor 102 to send output to the output devices 110. It is noted that the input driver 112 and the output driver 114 are optional components, and that the device 100 will operate in the same manner if the input driver 112 and the output driver 114 are not present. In the exemplary embodiment the output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm can perform the functionality described herein. Alternatively, it is contemplated that computing systems that do not perform processing tasks in accordance with a SIMD paradigm can also perform the functionality described herein.

Some devices incorporate various components described in FIG. 1 in a system on chip (SOC). An SOC is a device where many components of an entire system are resident on a chip. For example, an SOC may include a processor, memory, storage, input and output drivers, and other components on a single chip.

As described in FIG. 1, the processor 102, memory 104, storage 106, input driver 112, output driver 114 (including APD 116) may be included on an SOC 101. It should be noted that any combination of the components described above, as well as additional components, may be included in the SOC 101

Figure 2:
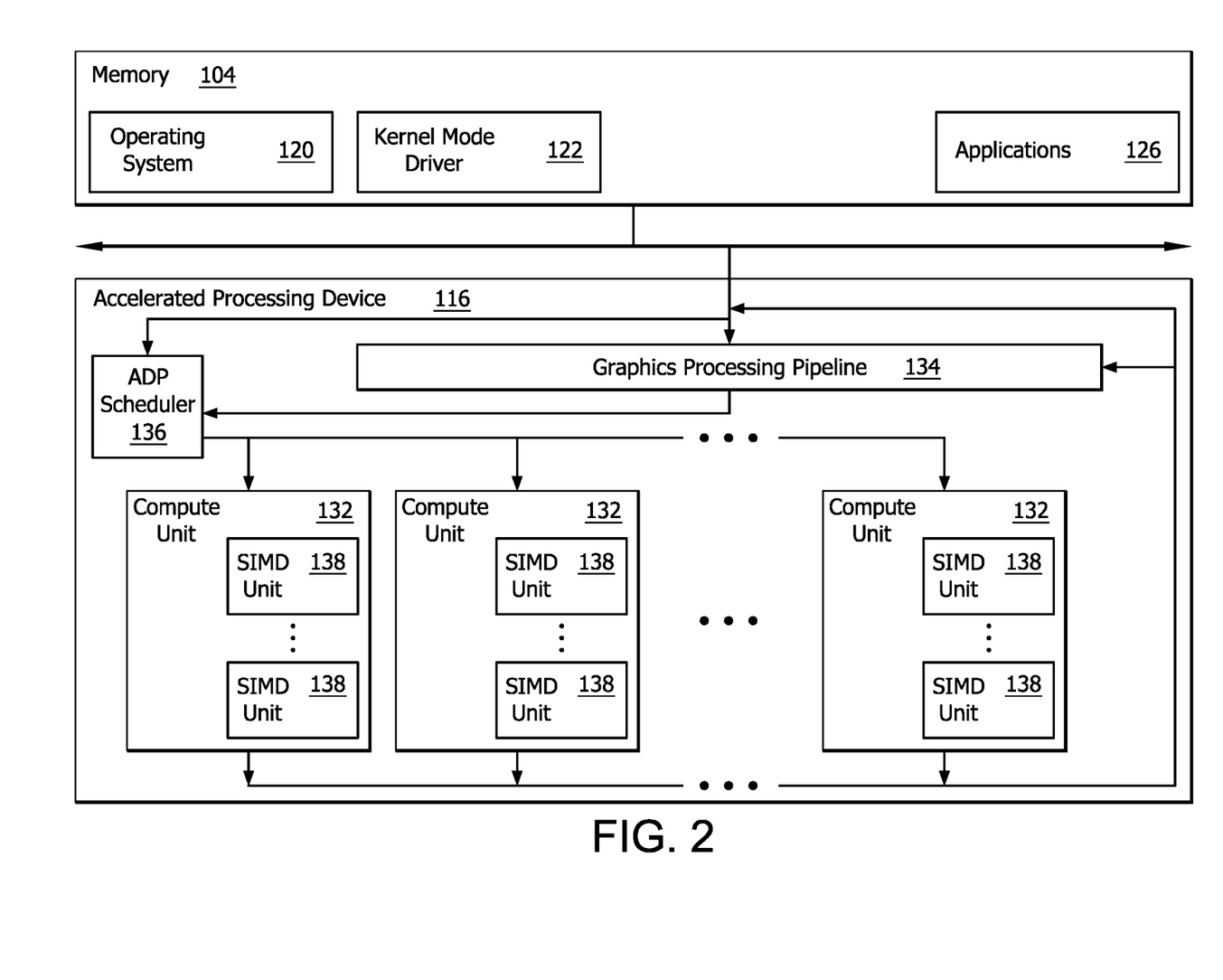
FIG. 2 is a block diagram of the device of FIG. 1, illustrating additional detail.

FIG. 2 is a block diagram of the device 100, illustrating additional details related to execution of processing tasks on the APD 116 or any example GPU. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that are or can be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with or using different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus, in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
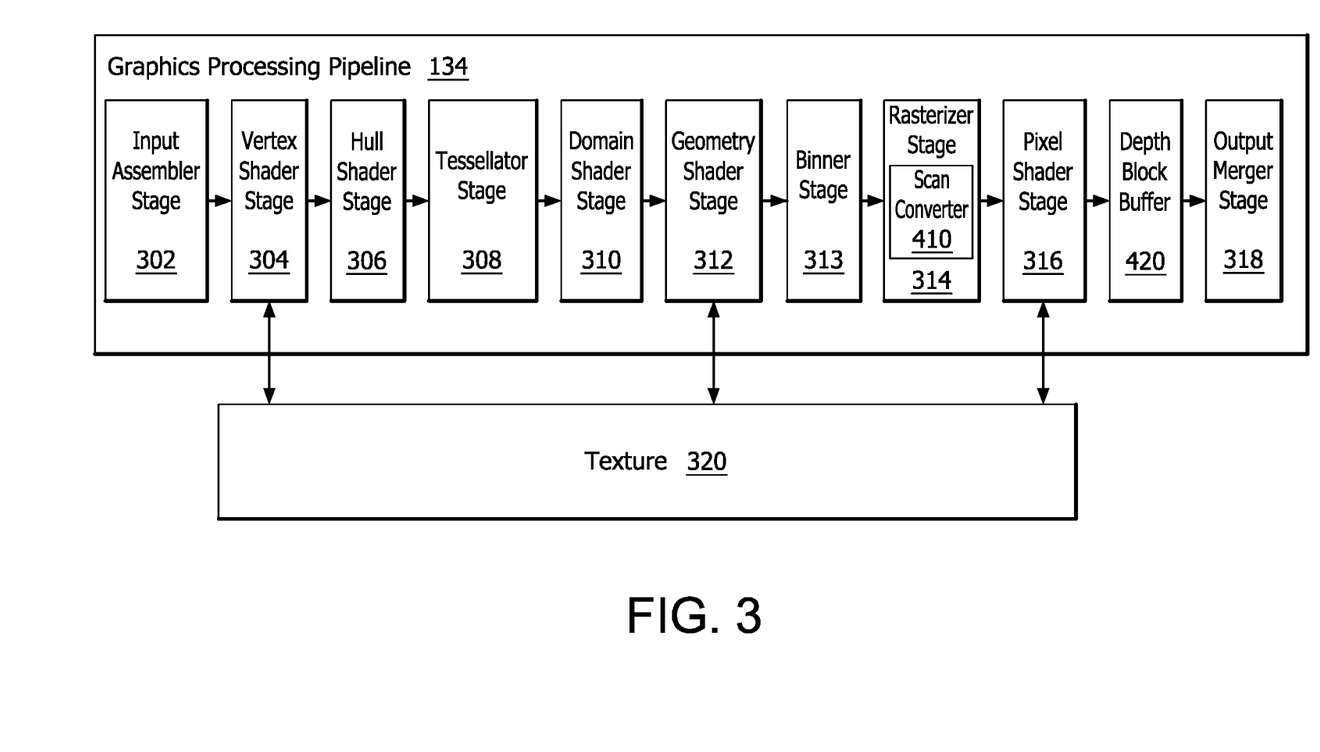
FIG. 3 is a block diagram illustrating a graphics processing pipeline, according to an example.

FIG. 3 is a block diagram showing additional details of the graphics processing pipeline 134 illustrated in FIG. 2. The graphics processing pipeline 134 includes logical stages that each performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the programmable processing units 202.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. In some instances, a shader program that executes on the programmable processing units 202 perform operations for the geometry shader stage 312.

The rasterizer stage 314 accepts and rasterizes simple primitives and generated upstream. Rasterization includes determining which screen pixels (or sub-pixel samples) are covered by a particular primitive. Rasterization is performed by fixed function hardware. The rasterizer stage 314 also includes one or more scan convertors 410. The scan convertor 410 separates graphics triangles into pixels that may then be visibility tested (e.g., by a depth block buffer described below), shaded by a pixel shader stage (described below) and blended into frame buffer render targets for display.

The pixel shader stage 316 calculates output values for screen pixels based on the primitives generated upstream and the results of rasterization. The pixel shader stage 316 can apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel.

Texture data, which defines textures, are stored and/or accessed by the texture unit 320. Textures are bitmap images that are used at various points in the graphics processing pipeline 134. For example, in some instances, the pixel shader stage 316 applies textures to pixels to improve apparent rendering complexity (e.g., to provide a more "photorealistic" look) without increasing the number of vertices to be rendered.

In some instances, the vertex shader stage 304 uses texture data from the texture unit 320 to modify primitives to increase complexity, by, for example, creating or modifying vertices for improved aesthetics. In one example, the vertex shader stage 304 uses a height map stored in the texture unit 320 to modify displacement of vertices. This type of technique can be used, for example, to generate more realistic looking water as compared with textures only being used in the pixel shader stage 316, by modifying the position and number of vertices used to render the water. In some instances, the geometry shader stage 312 accesses texture data from the texture unit 320.

Also residing in the graphics processing pipeline 134 is a depth block buffer 420, as mentioned previously. The depth block buffer may reside, in an example, after the pixel shader stage 316, and may also be part of the output merger stage 318. Additionally, although not shown, the depth block buffer 420 may reside immediately following the scan convertor 410.

The output of the scan convertor 410, in an example, are graphics tiles with planes which contain depth information about the images in the video stream of the graphics processing pipeline 134 for storage and, if required, further processing, in the depth block buffer 420.

That is, the depth block buffer 420 receives the tiles with planes from the scan convertor 410. Once received, the information is stored in a cache in the depth block buffer, and under certain circumstances, discussed in further detail below, undergoes compression.

Figure 4:
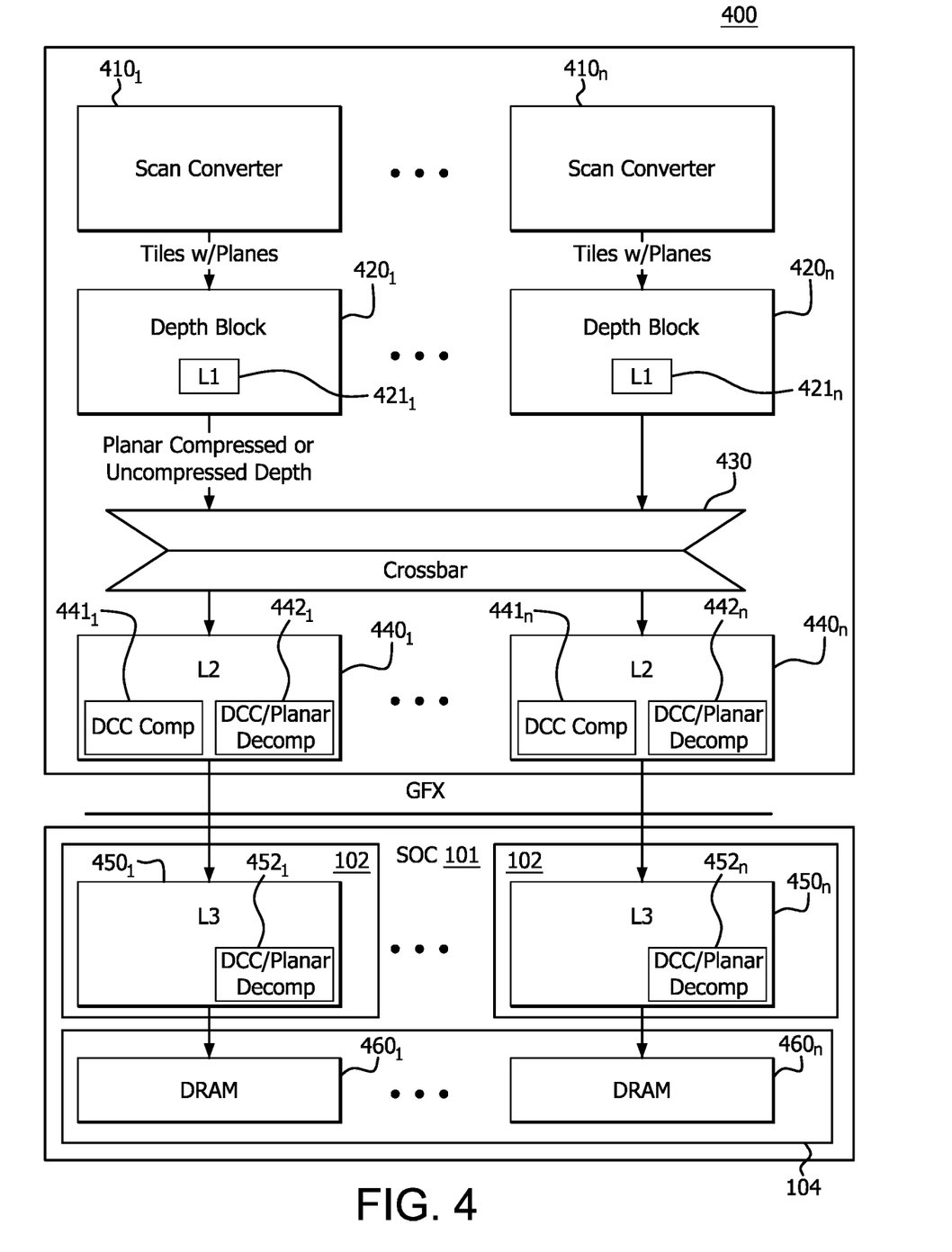
FIG. 4 is a block diagram illustrating a portion of the graphics pipeline of FIG. 3 in communication with the system on chip of FIG. 1, according to an example.

FIG. 4 is a block diagram 400 illustrating a portion of the graphics pipeline 134 (referred to as a graphics layer (GFX)) in communication with the SOC 101, according to an example. In the example block diagram 400, the graphics side circuitry (i.e., GFX) includes a plurality of the scan convertors 410 (designated $410_1$-$410_n$). depth block buffers 420 (designated $402_1$-$420_n$) that include level 1 (L1) caches 421 (designated $421_1$-$421_n$), a crossbar 430, and level 2 (L2) caches which include a delta color compression (DCC)

compressor 441 (designated 441₁-441ₙ) and a DCC/Planar decompressor 442 (designated 442₁-452ₙ). The SOC 101 includes level 3 (L3) caches 450 (designated 450₁-450ₙ) which reside for example in the memory 104 which include a DCC/Planar decompressor 452 (designated 452₁-452ₙ) and dynamic random access memory (DRAM) 460 (designated 460₁-460ₙ), which also resides in the memory 104.

As there may be a plurality of scan convertors 410 and depth block buffers 420 in the graphics processing pipeline 134, there may be a need to share information from one series of scan convertor/depth block buffer sets to an L2 cache associated with a different set of scan convertors/depth block buffers. Accordingly, the crossbar 430 may be utilized to allow information to flow from one set to another. It should be noted however, that a crossbar may not be utilized as well.

For example, to distribute a number (N) of depth blocks evenly across a number (M) of DRAM channels, a crossbar is an example device for allowing the information to be transferred from one set of scan converters 410/depth block buffers 420 to any of the DRAMs 460.

The elements shown in the GFX layer reside, for example, in graphics processing pipeline 134 as described above. The elements shown in the SOC of FIG. 4 reside, for example, alongside the APD 116 in the components described as above. However, it should be understood that the components may reside elsewhere in the system.

The below method recites various compression techniques such as DCC compression and planar compression. However, it is understood that the techniques and method described below are not limited to any particular compression scheme.

In the area of video compression, DCC and planar techniques may be utilized and therefore are described as example types of compression schemes. DCC is compression that utilizes data coherence to reduce required bandwidth for transmitting data.

It is a lossless type of compression, and adapted for 3D rendering. DCC processes whole blocks of data instead of individual pixels. Inside a block, only one value is stored with full precision, and the rest is stored as a delta (difference). If the colors are similar, the delta values may use fewer bits relative to the input. DCC is enabled on discrete GPUs and APUs. Block sizes in DCC may be adjusted based on access patterns (and the data itself) to optimize for potentially random accesses by a processor (e.g., APD 116).

In planar compression, the depth planes may be compressed. That is, the three-dimensional (3D) planes may be compressed. For example, points A, B and C in a 3D space comprise a plane. All points have an X, Y and Z value. The Z values are stored in the depth block buffer and the X and Y values of the triangle are rasterized by the scan convertor. The Z plane is the center Z value, and the dZ/dX, and dZ/dY plane equation allow an interpolator to generate any Z value along that plane from an X/Y offset from the center of that Z Plane.

Accordingly, this data is compressed in planar compression. As described below, planar compression may be utilized by the depth block buffers 420 prior to transferring the information to the L2 cache 440.

Again, although planar and DCC compression are described below, it should be noted that other compression techniques may be employed. For example, fragment compression may be utilized. In fragment compression, instead of storing per sample color values particularly when many of those samples colors are the same due to having been shaded as a set, the color per fragment is stored where a fragment is a set of samples in a specified region of screen space. More fragments are stored when there are more unique colors per region of screen space. Each region of screen space may be a pixel with multiple samples in it (e.g., MSAA) or a larger set of pixels that are all shaded at the same time (e.g., coarse Variable Rate Shading).

Additionally, machine intelligence activation compression may be utilized. That is, zero values are removed from a two dimensional (2D) array, and the remaining values are collapsed together.

Although the method of integrating compression is described in more detail below, briefly the depth block buffer 420 receives data (e.g., Z data in plane form) and either compresses it, (e.g., using planar compression) or transfers the data uncompressed to the L2 cache 440 (e.g., via the crossbar 430). The L2 cache 440 then transfers the data to the L3 cache 450 on the SOC. If the data received by the L2 cache 440 was uncompressed, then the L2 cache 440 compresses the data using DCC compression prior to transferring it to the L3 cache 450. Alternatively, the L3 cache 450 may transfer the data uncompressed depending on a desired implementation.

Figure 5:
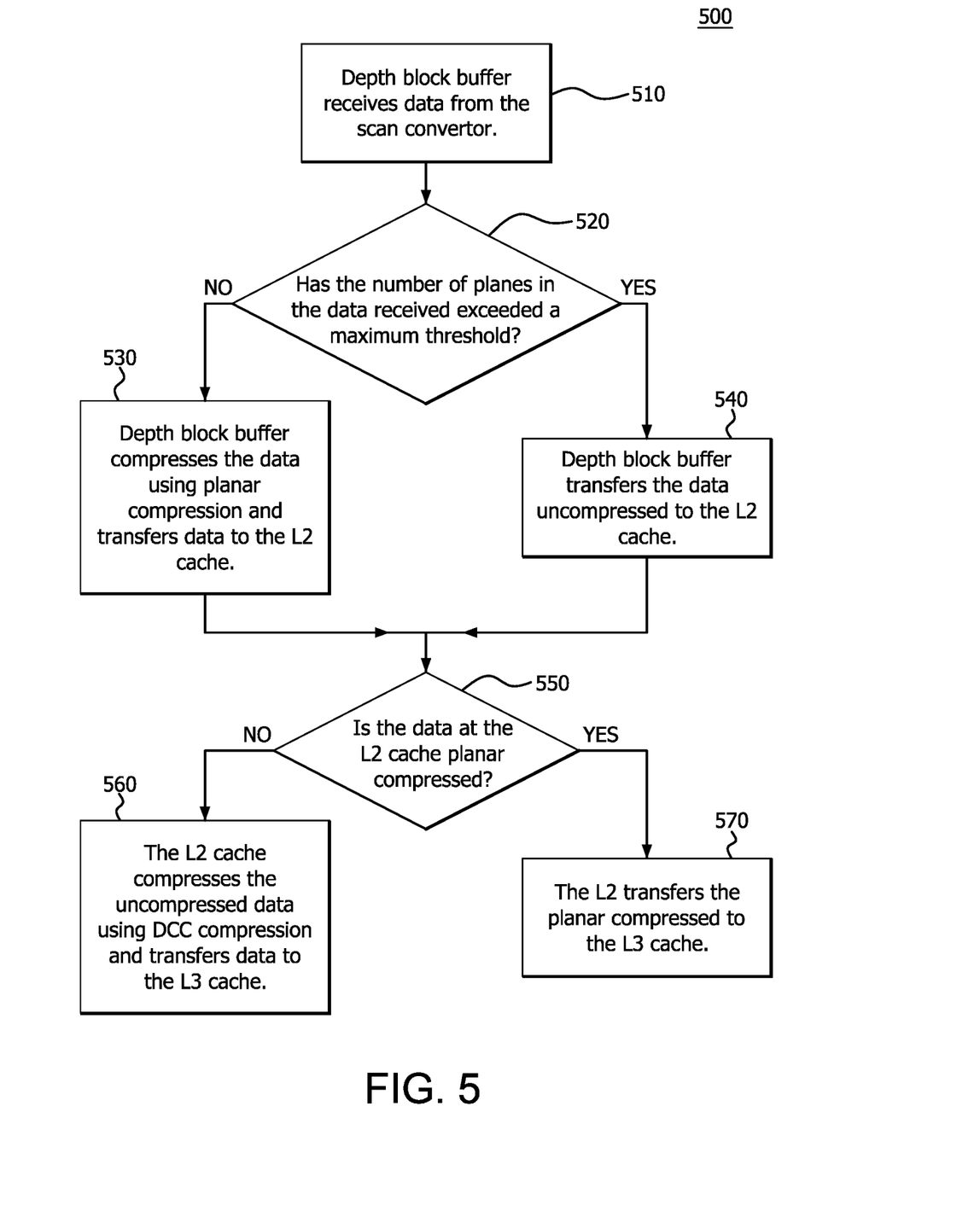
FIG. 5 is an example flow diagram of a method for integrating compression.

FIG. 5 is an example flow diagram of a method 500 for integrating compression. In step 510, the depth block buffer receives data from the scan convertor. The data may include primitives, Z plane data and may include color data.

It is determined if the number of planes in the data exceeds a maximum threshold (step 520). If the number of planes does not exceed the threshold, then the data is compressed and transferred to the L2 cache, or a higher layer (step 530), In one example, the technique for compression in step 530 is planar compression described above. Therefore, for purposes of example, the discussion below relates to the use of planar compression techniques in the present example method.

If the number of planes exceeds the threshold in step 520, then the data is transferred uncompressed to the L2 cache, or a higher layer (step 540). Although the threshold may be predefined, it may be, for example, less than the number of planes that can fit in a region's memory footprint (i.e., the amount of memory a region can store). In one example, the threshold may include 4 planes. This may result in a performance increase and maintain lower complexity for circuitry.

The data that the depth block buffers 420 receive from the scan converters 410 may include a plane equation, and the x/y coordinate of the region corresponding to the plane equation. In an example, the region may include an 8×8 pixel region, and the plane equation itself is comprised of 3 elements, the slope of the plane in the x-direction, the slope of the plane in the y direction, and the z value at the center of the 8×8 tile.

The 3 example elements described above form a plane equation (e.g., a 96 bit plane equation). Other differing sized regions may be utilized, with differing bit widths, but each may include similar elements to the elements described above.

Once at the L2 cache, it is determined before transfer of the data to a higher layer (e.g., L3 cache) if the data is planar compressed or uncompressed (step 550). If the data is not planar compressed, then the L2 cache compresses the data using DCC compression and transfers the data to a higher layer, such as the L3 cache (step 560).

If the data is planar compressed in step 550, then the L2 cache transfers the planar compressed data to a higher layer, such as the L3 cache (step 570). Although not shown in a method step, once the compressed data is received at the L3 cache, the data can be stored in a DRAM (e.g., DRAM 460). If the data is compressed, then the metadata that is also received by the L3 cache is stored in an address that is a function of the DRAM address.

Additionally, for non graphics (GFX) clients, the L3 decompresses compressed data as it is read from DRAM before being returned to applications/clients utilizing the data that do not process compressed data. An L3 universal decompressor may be used for any client, whether GFX or non-GFX. The client itself describes what kind of data it the client can process/read, and if the L3 determines that the compressed data does not match a supported format, it decompresses the data.

The above method can be utilized on any data transfer scheme in addition to graphics data that includes compressible color data and the like. For example, the above method may be utilized for transmission of data from non graphics clients, such as a display core, video encoders/decoders, and direct memory access (DMA) engines. In addition, although color data is one example referred to above, the data can additionally be plane data as well. Further, any client compression scheme such as planar depth compression and color fragment compression can be utilized to expand the data to be saved and smaller compressed representations are achieved by letting various clients pass pre-compressed data from their L1 caches to the next level cache.

The L2 cache then compresses it with DCC or not depending on compressibility and implementation cost.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, can be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general-purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for integrating data compression in a computer system, comprising:
    receiving first data at a first system level;
    based upon a number of planes of the first data being less than or equal to a threshold, compressing the data with a first data compression scheme, and transferring the data compressed with the first data compression scheme to a second system level for processing;
    based upon the number of planes of the first data exceeding the threshold, transferring the first data uncompressed to the second system level for processing;
    based upon the received data at the second system level being compressed with the first data compression scheme, transferring the data to a third system level; and
    based upon the received data at the second system level being uncompressed with the first compression scheme, compressing the data with a second data compression scheme, and transferring the data compressed with the second data compression scheme to the third system level.

2. The method of claim 1 wherein the first data compression scheme is a planar compression scheme.

3. The method of claim 2, further comprising transferring, by the second system level, metadata indicating a type of compression for the first data compression scheme.

4. The method of claim 3, further comprising storing, by the third system level the received data and the metadata.

5. The method of claim 1 wherein the second data compression scheme is a delta color compression (DCC) scheme.

6. The method of claim 5, further comprising transferring, by the second system level, metadata indicating a type of compression for the second compression scheme.

7. The method of claim 6, further comprising storing, by the third system level the received data and the metadata.

8. The method of claim 1 wherein the threshold is less than a number of planes a region of memory can store.

9. The method of claim 1 wherein the first system level is a level 1 (L1) cache, the second system level is a level 2 (L2) cache and the third system level is a level 3 (L3) cache.

10. An apparatus for integrating data compression in a computer system, comprising:
    a first system level device;
    a second system level device operatively coupled with and in communication with the first system level device; and
    a third system level device operatively coupled with and in communication with the second system level device; wherein:
        the first system level device is configured to receive first data;
        based upon a number of planes of the first data being less than or equal to a threshold, the first system level device is configured to compresss the first data with a first data compression scheme, and transfer the data compressed with the first data compression scheme to the second system level device for processing;

based upon the number of planes of the first data exceeding the threshold, the first system level device is configured to transfer the first data uncompressed to the second system level device for processing;

based upon the received data at the second system level device being compressed with the first compression scheme, the second system level device is configured to transfer the data to the third system level device; and based upon the received data at the second system level device being uncompressed with the first compression scheme, the second system level device is configured to compress the data with a second data compression scheme, and transfer the data compressed with the second data compression scheme to the third system level device.

11. The apparatus of claim 10 wherein the first data compression scheme is a planar compression scheme.

12. The apparatus of claim 11, wherein the second system level device is configured to transfer metadata indicating a type of compression for the first data compression scheme.

13. The apparatus of claim 12, wherein the third system level device is configured to store the received data and the metadata.

14. The apparatus of claim 10 wherein the second data compression scheme is a delta color compression (DCC) scheme.

15. The apparatus of claim 14, wherein the second system level device is configured to transfer metadata indicating a type of compression for the second compression scheme.

16. The apparatus of claim 15, wherein the third system level device is configured to store the received data and the metadata.

17. The apparatus of claim 10 wherein the threshold is less than a number of planes a region of memory can store.

18. The apparatus of claim 10 wherein the first system level device is a level 1 (L1) cache, the second system level device is a level 2 (L2) cache and the third system level device is a level 3 (L3) cache.

19. A non-transitory computer-readable medium for integrating data compression in a computer system including a processor, the non-transitory computer-readable medium having instructions recorded thereon, that when executed by the processor, cause the processor to perform operations including:

receiving first data at a first system level;

based upon a number of planes of the first data being less than or equal to a threshold, compressing the data with a first data compression scheme, and transferring the data compressed with the first data compression scheme to a second system level for processing;

based upon the number of planes of the first data exceeding the threshold, transferring the first data uncompressed to the second system level for processing;

based upon the received data at the second system level being compressed with the first data compression scheme, transferring the data to a third system level; and based upon the received data at the second system level being uncompressed with the first compression scheme, compressing the data with a second data compression scheme, and transferring the data compressed with the second data compression scheme to the third system level.

20. The non-transitory computer-readable medium of claim 19 wherein the first data compression scheme is planar compression and the second data compression scheme is delta color compression (DCC).

* * * * *